United States Patent [19]
Guesnon et al.

[11] Patent Number: 5,220,961
[45] Date of Patent: Jun. 22, 1993

[54] ASSEMBLY COMPRISING AN EXTENSION TUBE AND A SLEEVING CONDUIT INSIDE THIS TUBE

[75] Inventors: Jean Guesnon, Saint Germain en Laye; Louis Barge, Nanterre, both of France

[73] Assignee: Institut Francais du Petrole, Rueil-Malmaison, France

[21] Appl. No.: 671,706

[22] PCT Filed: Aug. 2, 1990

[86] PCT No.: PCT/FR90/00586

§ 371 Date: Jun. 4, 1991

§ 102(e) Date: Jun. 4, 1991

[87] PCT Pub. No.: WO91/02137

PCT Pub. Date: Feb. 21, 1991

[30] Foreign Application Priority Data

Aug. 7, 1989 [FR] France .................. EN. 89/10.755

[51] Int. Cl.$^5$ ................................. E21B 17/01
[52] U.S. Cl. .................. 166/367; 166/77.5; 166/89
[58] Field of Search ............... 166/338, 341, 344, 348, 166/359, 361, 350, 355

[56] References Cited

U.S. PATENT DOCUMENTS

| | | | |
|---|---|---|---|
| 3,217,805 | 11/1965 | Howard | 166/344 |
| 3,971,576 | 7/1976 | Herd et al. | 166/359 |
| 4,059,148 | 11/1977 | Blomsma | 166/359 |
| 4,081,039 | 3/1978 | Wardlaw | 166/359 |
| 4,284,142 | 8/1981 | Kirkland | 166/344 |
| 4,289,206 | 9/1981 | Kirkland | 166/341 |
| 4,320,804 | 3/1982 | Brooks | 166/344 |
| 4,436,157 | 3/1984 | Brooks | 166/344 |
| 4,858,690 | 8/1989 | Rebardi et al. | 166/278 |
| 4,958,686 | 9/1990 | Putch | 166/348 |

*Primary Examiner*—Terry Lee Melius
*Assistant Examiner*—Frank S. Tsay
*Attorney, Agent, or Firm*—Antonelli, Terry, Stout & Kraus

[57] ABSTRACT

An assembly which includes an extension tube and a sleeving conduit disposed therein. The tube includes a number of components connected together. The sleeving conduit includes several components and the assembly includes a device for fitting each of the conduit components to a corresponding component of the tube. The assembly may be readily used in oil rigs at sea and/or petroleum exploration and exploitation at sea.

16 Claims, 6 Drawing Sheets

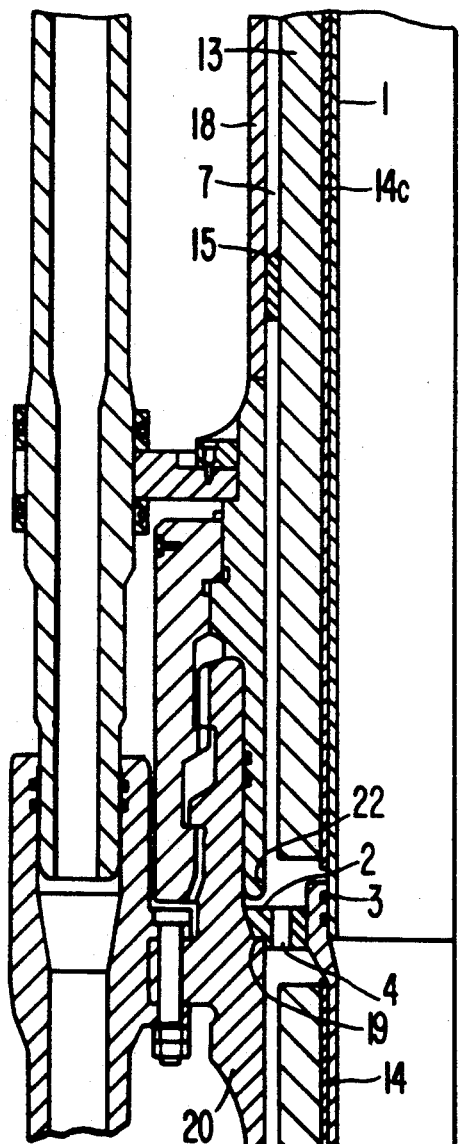
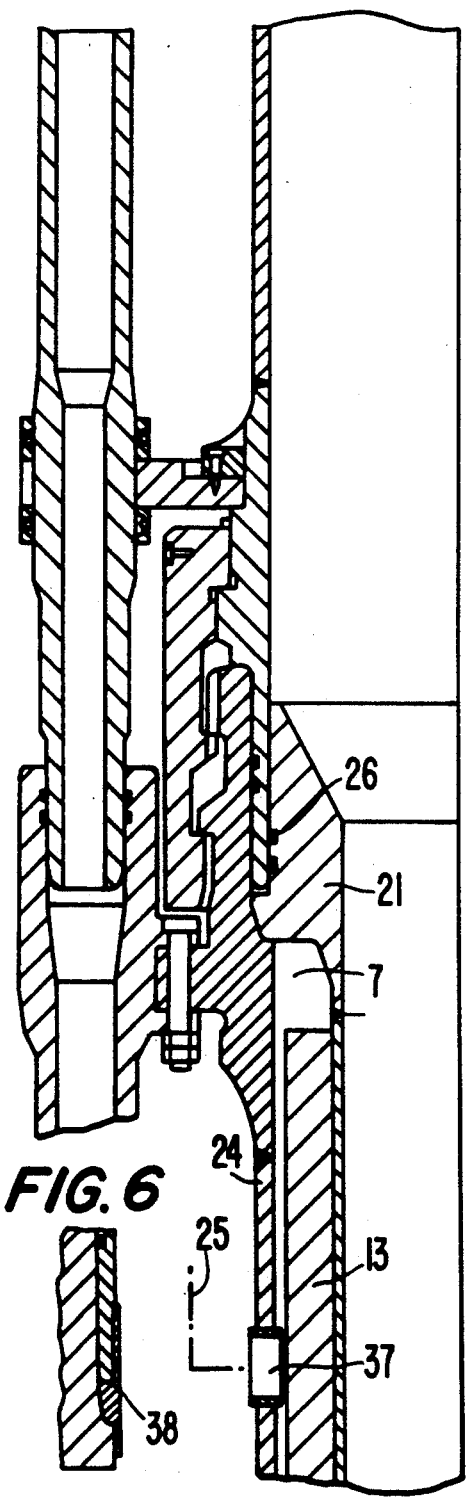
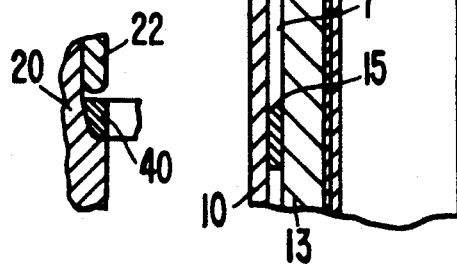

ASSEMBLY COMPRISING AN EXTENSION TUBE AND A SLEEVING CONDUIT INSIDE THIS TUBE

FIELD OF THE INVENTION

The present invention relates to an assembly comprising an extension tube and a sleeving conduit.

BACKGROUND OF THE INVENTION

The principle of sleeving the main tube of a riser in offshore drilling is known from the prior art. However, prior art devices are based on the principle of a rigid connection between the sleeving conduit elements providing transmission of a longitudinal force and tightness between the inside and the outside of the sleeving.

Such connections may be produced in the same manner as those ordinarily used for well tubing with a threaded assembly which is fairly time-consuming and difficult to effect, and whose reliability of tightness and mechanical strength over a given time period may be questionable after several assembly and disassembly operations. Specially designed connectors of the riser connector type are difficult to design in view of the small space available and would considerably increase the weight and cost of sleeving.

Because of the principle upon which prior sleevings have been developed, the prior sleeving systems require the use of a sliding seal inserted into the sleeving in order to compensate for the differential longitudinal deformations of the sleeving conduit and the tube under the effect of variations in traction, pressure and temperature. This sliding seal, since it requires a long travel path, may be several meters in length and is difficult to use since the seal is subjected to substantial pressure differentials and especially since the seal would be located at a lower part of the sleeving conduit.

SUMMARY OF THE INVENTION

In offshore drilling, an assembly according to the present invention has a twin objective, namely, decreasing the volume of mud employed, and decreasing the total mass and apparent weight of the extension tube and its contents, thereby allowing the assembly to be used at considerable depths when the mud density is high and the wellhead tensioning capability is limited.

"Extension tube", as used in this text, is understood to be the main conduit of a riser, with the conduit connecting the sea bed to a floating installation at the surface. The conduit may, for example, be a production, a drilling, or an intervention (maintenance) conduit in a well.

The aim underlying the present invention essentially resides in providing an assembly of the aforementioned type which avoids the above mentioned disadvantages.

According to the present invention, the extension tube has several elements adapted to be connected together. When the extension tube is to be use alone, for example, when a large-diameter passage is required, when, for example, drilling holes up to 17½" in diameter are necessary, these elements of the extension tube are simply connected together.

When the necessary passage diameter is smaller such as, for example, in the small-diameter drilling phases of 12¼" and above, a sleeving conduit is used to obtain the advantages noted above.

According to the invention, the sleeving conduit, having an outside diameter less than an inner diameter of the extension tube, has several elements Each sleeving element and each tube element has means for supporting the former in the latter. Axial locking of a sleeving element to the extension tube is accomplished automatically upon connection of two adjacent sleeving elements of the extension tube which accommodates, with some clearance, the supporting means serving to hold the sleeving elements.

Tightness between the sleeving elements is obtained by virtue of nesting of the sleeving elements.

The assembly according to the invention allows the weight of the sleeving to be transferred to the extension tube in a stepped manner, thereby solving the problems created by differences in expansion between the extension tube and the sleeving conduit by dividing it, for a few centimeters, between each connection. Moreover, the assembly according to the invention is easy and quick to implement, with each conduit element simply being supported by an element of the extension tube. Thus, without a special assembly operation, the sleeving elements can be fitted into or removed from the corresponding tube elements. Of course this assumes that the elements of the extension tube are disassembled. By virtue of the features of the present invention, each sleeving element has only it own weight to support, and not the weight of the other sleeving elements below it.

The sleeving principle according to the present invention has a number of advantages over prior art devices such as, for example, a tightness of the conduit elements may be achieved by simple nesting, and only minor modifications to the existing riser connectors to receive the sleeving are necessary, particularly in a "Clip Riser" which is a registered trademark of the Institut Francais du Petrole. Moreover, the sleeving requires no tensioning when fitted into the riser, and hence no time-consuming operations with expensive special tools.

Furthermore, by virtue of the constructional features of the present invention, the sleeving is not dynamically stressed. Additionally, if during drilling with the aid of the sleeving, the riser must be refitted, this refitting and that of the sleeving are accomplished simultaneously, thereby affording considerable time savings.

The same advantages apply to re-lowering the riser equipped with the sleeving.

More generally, the present invention relates to an assembly having an extension tube and a sleeving conduit inside this tube, with the tube comprising several assembled elements. The sleeving conduit also has several elements and the assembly includes mean for fitting each of the conduit elements to a corresponding element of the tube. The fitting means are designed to support the elements of the conduit on an element of the tube.

Each conduit element has two ends, one of which may be male and the other female. The male end is constructed to cooperate with the female end of the adjacent conduit element. Moreover, the assembly according to the invention may have means for creating tightness between the space inside the conduit and the annular space delimited by the inner wall of the tube and the outer wall of the conduit, with such means including seals.

The male end of a conduit element may be constructed to slide in the female end of the adjacent conduit element in order to compensate for different degrees of deformation in the conduit and the tube without the stress of differences in traction, pressure and temperature. This prevents accumulation of stresses due to the bottom effect on the entire conduit, and limits them. Each element undergoes only the bottom effects to which it is subjected and supports only its own weight.

The connecting means may include a supporting part attached to one end of the conduit element, with the supporting part being constructed to nest in a recess located at the end of an element of this tube. The supporting part may have passages for allowing circulation and/or communication through the annular space.

The ends of two adjacent elements of the tube may cooperate with each other to limit displacements of the supporting part.

The supporting part may be a suspension part or a bearing part supporting, in the first case, the load of a sleeving conduit element located below it and, in the second case, the load of a conduit element located above it.

The assembly according to the invention may comprise sealing means at the upper and lower ends of the conduit, with the means providing tightness of the annular space delimited by the outer wall of the conduit and the inner wall of the tube. The sealing means of the lower part may be constructed to allow the conduit to slide relative to the tube.

The development of offshore deep drilling with the use of the 21" extension tube associated with column head sealing systems known as 18¾" BOPs allows the use of steel to come under advantageous consideration for the sleeving conduit, although other lighter materials such as titanium alloys and composites could be considered. In particular, at least one of the conduit elements may be encircled by reinforcing bands. This banded portion of the conduit element may be located at the lower part of the conduit.

Of course, an entire portion of conduit may be banded and could preferably be located at the lower part of the conduit. Banding of the conduit at its lower part allows the performance of this portion of conduit to be adjusted to its use conditions. Thus, at the lower part of the conduit, internal pressures increase, so that the conduit walls of this part must withstand the pressures.

At least one of the conduit elements ma have flotation means, and the adjacent ends of two tube elements may have a bayonet type connector.

The assembly according to the invention may comprise means for positioning, guiding, and supporting the conduit in the tube.

The tube may have one opening in the vicinity of its lower end and another opening in the vicinity of its upper end, with these openings being constructed to be connected to means for circulating a fluid in the annular space delimited by the inner wall of the tube and the outer wall of the conduit.

The assembly according to the invention may comprise at least one other conduit having several elements connected together, with this other conduit being inside the same conduit. Moreover, the assembly according to the invention may have means for assembling each of the elements of the other conduit to one element of the first conduit.

BRIEF DESCRIPTION OF THE DRAWINGS

The present invention will be better understood and its advantages will emerge more clearly from the following description of particular and nonlimiting examples illustrated by the attached drawings, wherein:

FIGS. 2, 3 and 4 are elevational views, partially in section of a lower end, a riser element, and an upper end of an extension tube equipped with sleeving, respectively;

FIGS. 5, 6, and 7 are cross-sectional views of elements for protecting the threads, the seal retainers, or to block off a recess serving to support a sleeving element, with the protective or blocking element being fitted in the absence of the sleeving;

DETAILED DESCRIPTION

Figure 1:
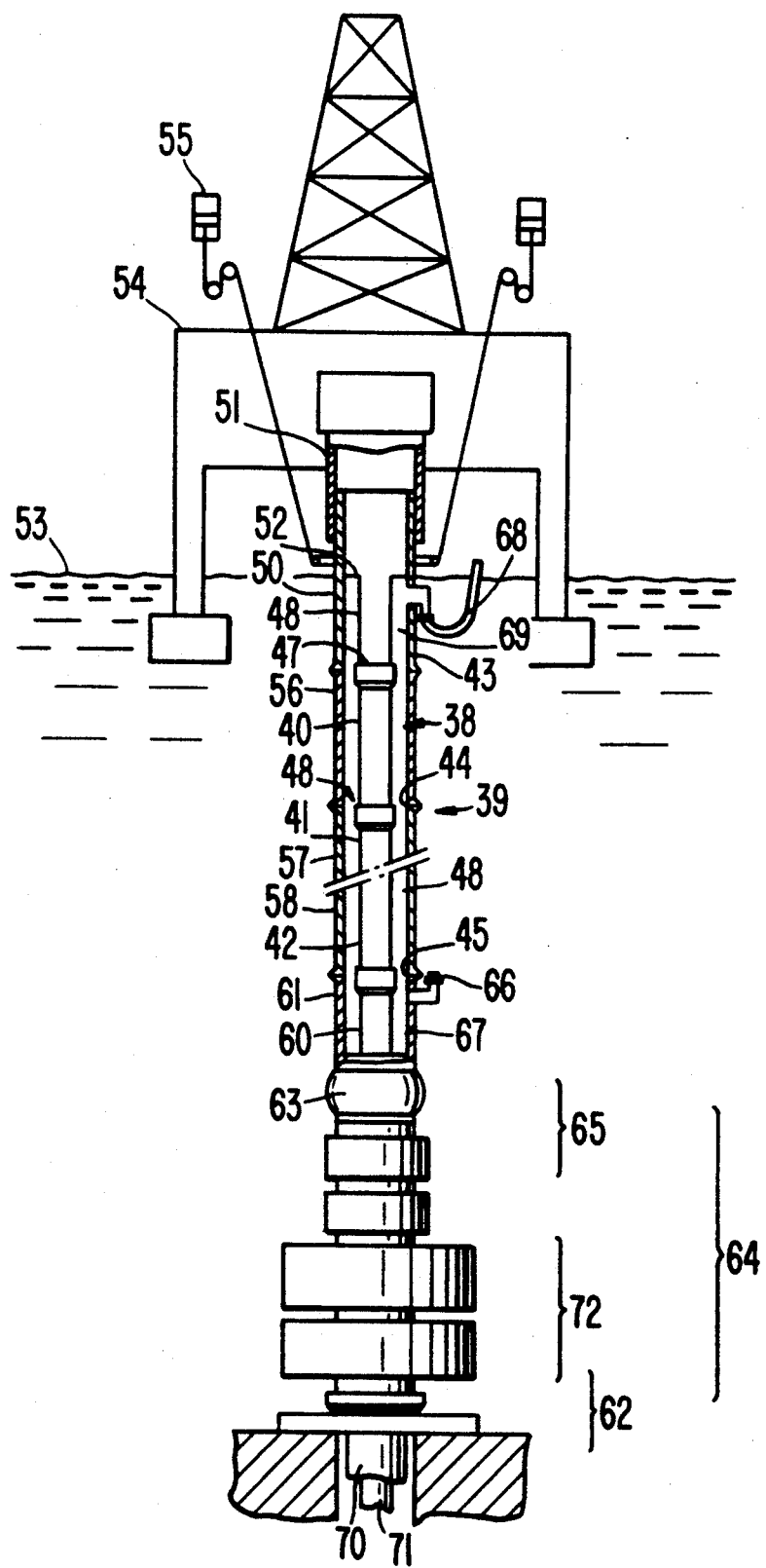
FIG. 1 is a schematic partial cross-sectional view of an assembly according to the invention as applied to the field of drilling.

Referring now to the drawings wherein like reference numerals are used throughout the various views to designate like parts and, more particularly, to FIG. 1, according to this figure, a floating installation 54 supports an assembly according to the invention on a surface 53 of water by tensioning devices 55.

A sleeving conduit 38, composed of tubular elements, is installed outside a drilling extension tube 39, with the sleeving conduit 38 including several elements 40, 41, 42. Each of the elements 40, 41, 42 is connected lengthwise at 43, 44, etc. to the extension tube. A link 46 between two consecutive sleeving elements 40, 41, provides a seal between the inside 47 of the sleeving and an annular space 48 located between the sleeving conduit 38 and extension tube 39, with no transmission of force in a longitudinal direction. The drilling extension tube 39 includes a plurality of elements 50, 56, 57, 58, 61 connected by connectors.

An upper element 49 of the sleeving 38 may be installed in a first element of the extension tube 39 beyond a telescopic joining element 51, connected longitudinally to the extension tube 39, and also seal the annular space 48 created between the sleeving conduit 38 and the extension tube 39.

The telescopic joining element 51 allows for the movements of the floating installation 54 relative to the sea bed to be absorbed These movements may be due to swell. The telescopic joining element 51 has two tubes, one of which slides inside the other.

A lower sleeving element 60 may be installed in the last element 61 of the extension tube 39 located before wellhead 62, possibly with a flexible joint 63, a general lower sealing assembly 64 (BOP) designed by the individual skilled in the art, which may have an LMRP 65. This assembly is connected lengthwise to the extension tube and also ensures lower sealing of the annular space 48 created between the sleeving conduit 38 and the extension tube 39.

Each element 40, 41, 42, 49, 60, etc. of the sleeving may hence be dimensioned solely as a function of the pressure differential between the inside of the sleeving and the annular space 48, with the only force applied in the longitudinal direction being a weight of the respective elements which may be disregarded.

By its design, the sleeving according to the invention is dimensioned only for a pressure differential between an interior of the sleeving and the annular space, and practically does not operate traction-wise. The banding or reinforcing process described in FR-A-2491044 applies very well to this type of sleeving, and would allow the weight to be reduced still further by reinforcing only the lower sleeving elements, i.e. those subjected to the greatest stresses in a manner shown in FIGS. 2 and 3, wherein a banding or reinforcing layer 14a is provided only at the lower sleeving element but no banding or reinforcing layer is provided at the upper sleeving element (FIG. 4).

The size of the banding or reinforcing layer 14a can be adapted to the stresses to which the various conduit elements are subjected. Thus, the more these elements are called upon to withstand major stresses, the larger the banding layer 14a may be. Thus, the banding or reinforcing layer 14 of the lowermost conduit element may be thicker than the banding or reinforcing layer 14b of the conduit element above it. Banding or reinforcing layer 14b may itself be above the banding or reinforcing layer 14c of the conduit element above the one containing the banding or reinforcing layer 14b.

It will not be a departure from the present invention to make portions of several sleeving elements, each being composed of elements of the same type of banding or reinforcing (with the same performance). This makes it unnecessary to have a plurality of different types of sleeving elements and limits marking or identifying of these conduit elements.

The pressure in the annular space 48 can easily be adjusted at any time by a line connecting the lower part 67 of the annular space 48 to the surface. The sleeving may be lightened by conventional syntactic foam arrangements 13 that are accommodated in a part of the annular space 48. A conduit 66, which may be a mud booster line, connects lower part 67 of the annular space 48 to a reservoir located on the floating support. This reservoir will be used to fill the annular space 48 when the sleeving is fitted and will serve to compensate for variations in volume that may continuously occur due to, for example, variations in temperature, riser tension, etc.

Another conduit 68 may also connect upper part 69 of the annular space 48 to another reservoir located on the floating installation or support 54 in order to thus create a possibility of fluid circulating in the annular space 48.

The same annular space 48 will be filled with sea water or any other low-density liquid such as, for example, fuel, liquid syntactic foam, etc., by lines 66 and 68.

An example is given below of fitting the sleeving together, with a detailed description of certain elements according to the invention in particular but not limited case of drilling.

In a first phase, drilling operations are conducted through a drilling riser a shown in FIG. 1 but not equipped with the sleeving. This riser or extension tube connects the floating installation or support 54 to a wellhead 62 anchored in the sea bed. The riser diameter is, for example, 21", with the progress of drilling being such that several casings 70, 71, etc. have been installed and cemented in order to hold the well walls. In FIG. 1, the 17½" diameter drilling phase has just been completed, and a 13⅜" casing has been installed and cemented.

Drilling is now to continue in a smaller diameter, for example, 12¼" with a higher density mud. In order not to have to increase the tension at the head of the riser beyond the capacity of tensioners 55 and to keep the mud and spoil rise speed as constant as possible during the entire raising phase, it is necessary to sleeve the riser.

Figure 2:
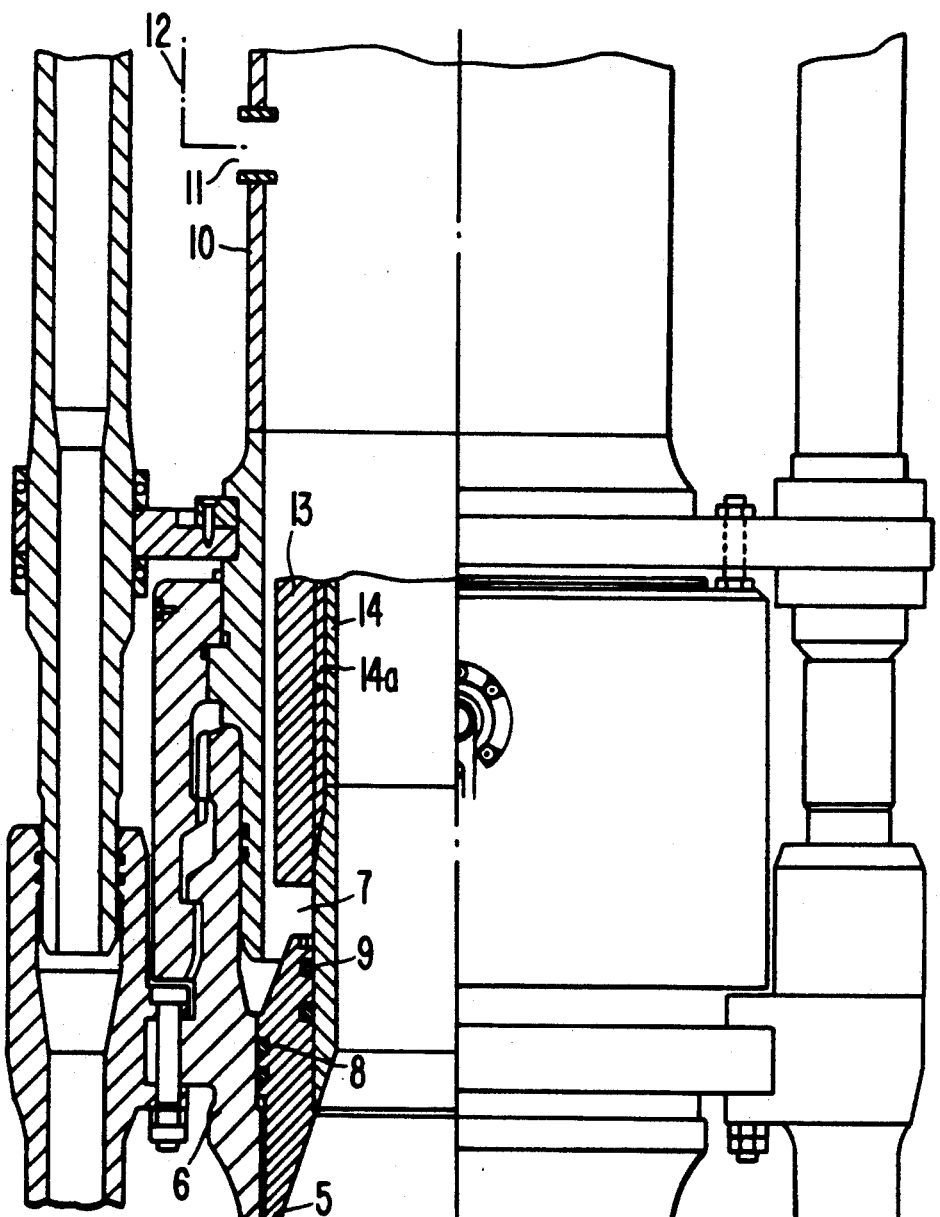

If a BOP 64, having two sealing subassemblies 65 and 72, is used, the well can be closed by jaws located on sealing subassembly 72, the riser and LMRP 65 will be disconnected and brought to the surface in order for the female element 6, FIG. 2, of the lower connector of the riser, which may be a flex joint 63, to be above the spider located on the rotary table.

On the drilling floating installation or support 54, the riser sleeving conduit elements 1, that is the bottom element and top element have already been equipped with a suspension part 2, sealing joints 3 (FIG. 3), 8 (FIG. 2), 9 (FIG. 2), and 26 (FIG. 4), floats and/or centering devices 15 (FIG. 3) which function to prevent the sleeving from buckling.

Figure 5:
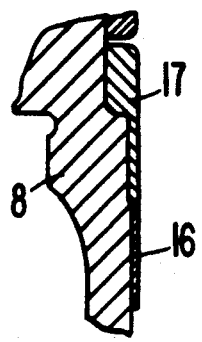

Suspension parts 2, the riser elements of the bottom element, may have holes 4 to allow fluid to pass into an annular zone 7. Sealing part 5 of the lower part of the annular space 7, provided with its sealing joints 8 and 9, is installed in the female element 6 of a first connector of the riser, which may be that of the flex joint located just above the LMRP 65. The sealing part 5 may be attached by threading and, in this case, with a drilling operation, in the absence of the sealing part 5, care must be taken to protect threads 16 and the seal retainer by a protective part 17, (FIG. 5). A short element 10 of the riser is then connected to the female element 6, with the short element 10 being provided with an orifice 11 connected to conduit 12 (FIG. 2) 68 (FIG. 1) which may be the mud booster line. The assembly thus constituted is lowered to the spider located on the rotary table.

A short sleeving element 14 (FIG. 2), 60 (FIG. 1), whose length corresponds essentially to that of the short element 10 of the riser, is then slid inside the riser. The end of the sleeving element 14 cooperates with the sealing part 5 to create a seal through seals 9 The sleeving element 14 has a suspension part 2 (FIG. 3), with the suspension part 1 resting on a shoulder 19 provided at the upper part of the short element 10. A riser element 18 is then connected and is longitudinally immobilized by its end 22 with a slight clearance with respect to the sleeving element 14 by the suspension part 2. The assembly is then lowered again to the rotary table.

A riser sleeving element 1, fully equipped, is then introduced and creates a seal with the short element 10 by the sealing joints 3. The operation is thus repeated until the last riser sleeving element is installed.

Figure 9:
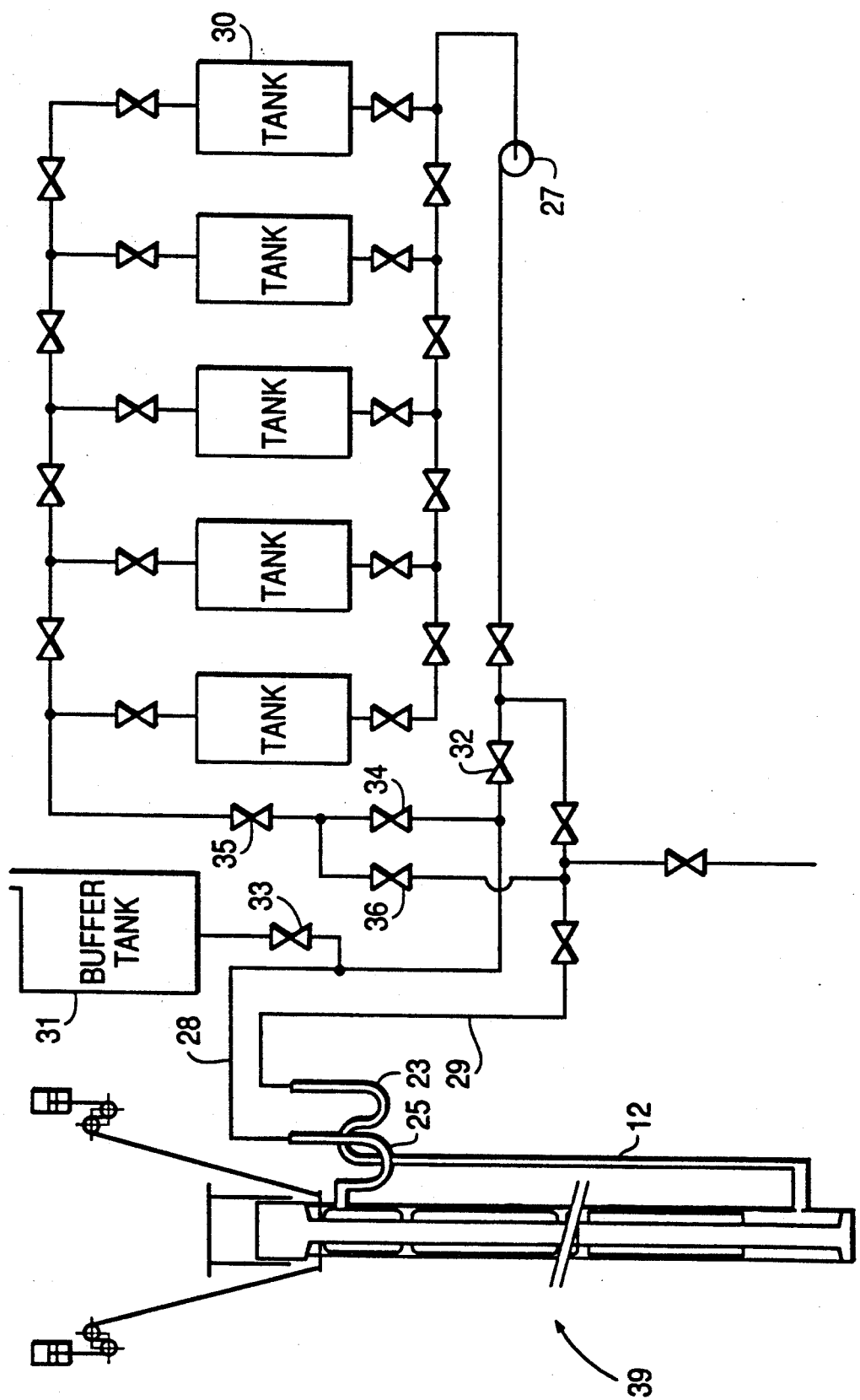
FIG. 9 is a schematic view of an arrangement for filling of the annular space defined between the inner wall of the tube and the outer wall of the sleeving.

The annular space 48 is regularly filled with sea water either through conduit 12 or through orifices 4 of the suspension part 2 in order not to have to connect and reconnect hose 23 each time (FIG. 9). Care should be taken to never completely fill the last sleeving element, as long as it has not yet been immobilized in a longitudinal direction by the riser element above it since, even if it has no float, it will be buoyant (in the case of a 13⅜" steel sleeving), with the water level in the sleeving corresponding to sea level, hence far lower, if the floating support is a semi-submersible platform with a considerable heightwise distance between the working bridge of the platform and the surface of the water.

When the latter riser sleeving element is in place, the last riser element 24 (FIG. 4), 50 (FIG. 1) is connected, with the last riser element being provided with a orifice 37 allowing communication between the top of the annular space 48 and storage reservoirs located on the platform 54 via a hose 25 (FIG. 4 or 9), 68 (FIG. 1). The entire assembly is lowered again to the spider. The last short sleeving element 21 (FIG. 4) or 49 (FIG. 1) is fitted.

The telescopic joining element 51 is then installed. Part of the joining element 51 immobilizes the upper short sleeving element 21 lengthwise and, by seals 26, provides the upper seal of the annular space which may now be entirely filled with sea water.

The last part of the lowering of the riser is carried out conventionally. The tensioners or tensioning devices 55 are activated and the connection between the riser and the BOP 64 is effected. Hoses 23, 25 as well as the hoses of the other peripheral lines are reconnected.

The liquid that is to occupy the annular space between the sleeving and the extension tube, if other than sea water (fuel, liquid syntactic foam, etc.) must be added at this point in time. This is accomplished by a pump 27 (FIG. 9) by injecting the liquid at the top of the annular space 48 through line 28. The sea water which previously occupied the annular space 48 rises through the conduit 12 and may be recovered in a tank 30 or be discharged to the sea through line 29 (FIG. 9). When the entire annular space 48 is filled with liquid, the line 29 will be closed and a valve 33 will be opened, and the buffer tank 31, preferably located at the level of the drilling floor, will be filled to the desired level. This buffer tank 31, known to the individual skilled in the art as "possum belly tank", will compensate for the variations in volume that may occur at any time during drilling, and will allow a constant pressure to be maintained at the upper part of the sleeving. The valve 32 will then be closed.

It will not be a departure from the scope of the present invention to pressurize the annular space. This will allow the stresses in the tube and walls of the sleeving to be optimized.

A drill string may be lowered inside the riser, through the sleeving, to the point above the BOP 64, the sea water contained in the sleeving may be displaced by mud, the BOP 64 may be re-opened and tested, and the 12¼" drilling may commence and continue normally.

If necessary, the liquid in the annular space between the sleeving conduit and extension tube may be changed at any time.

When the drilling operations are complete, the well is abandoned in a conventional manner when the last cement plug is set in place, the mud contained in the riser and the sleeving is replaced by sea water, and the fluid contained in the annular space 48 is recovered in the following manner. Sea water is pumped into the conduit 12 and, since valves 32, 33 and 36 are closed and valves 34 and 35 are open due to a set of valves the liquid can be returned to its storage reservoir. If the annular space 48 is filled with liquid syntactic foam with several different density levels, the liquids will be recovered one after the other from the lowest density to the highest density and each is placed in its storage reservoir by a set of valves.

The riser, its sleeving, and the BOP 64 will then be raised by reversing the method used to lower them.

Figure 4A:
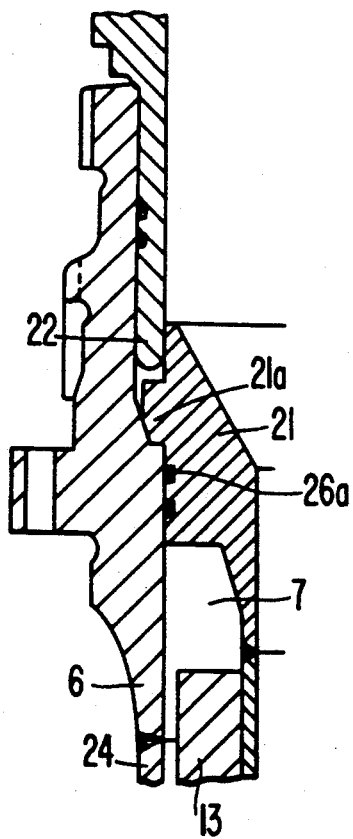
FIG. 4A is a cross-sectional view of a portion of an alternative embodiment of a suspension part at the upper end of the sleeving.

FIG. 4A illustrates an alternative embodiment relating to the upper end of the upper short element 21 of the sleeving conduit.

According to this alternative embodiment, seals 26A, retained by the upper element 21 of the sleeving conduit, cooperate with upper element 6A of the extension tube and not with part 22A of the telescopic connection elements.

Seals 26A have the same functions as seals 26 in FIG. 4, namely, creating tightness of the annular zone 7 (FIG. 4) or 69 (FIG. 1) in their upper parts.

Figure 10:
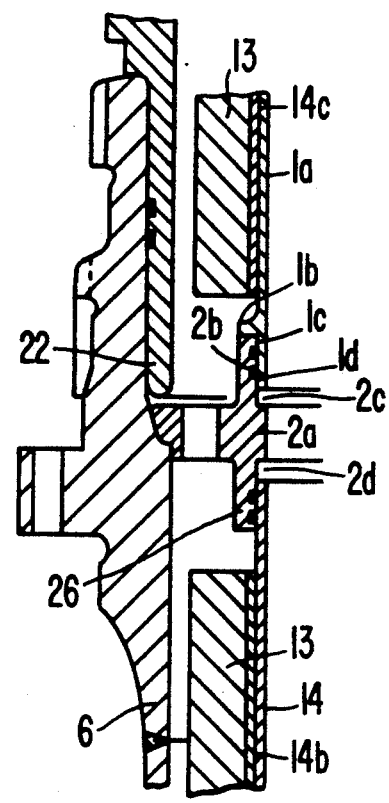
FIGS. 10 and 11 are cross-sectional views of portions of alternate arrangements wherein the supporting parts have support faces which support a weight of a sleeving.

FIG. 10 represents an alternative embodiment of the suspension device according to the present invention. According to this embodiment, supporting part 2a provides a resting support for the element of the sleeving conduit.

The element 1a is located above the supporting 2a and has a support shoulder 1b and a male end 1c which cooperates with a female part 2b of the supporting part 2a.

It will not be a departure from the present invention if the support system and stop, instead of being external to the sleeving conduit as shown in FIG. 10, are internal thereto. This can be accomplished by an internal shoulder 1e provided in the supporting part on which the lower end 1d will rest. Of course, this assumes that the sleeving conduit element 1a has no shoulder 1b.

The upper end of the conduit element 1a cooperates with the supporting part above it in the same manner as the element 10a cooperates with the supporting part 2a. The upper male end of the element 10a cooperates with the element end 2c of the supporting part 2a. The upper male end of the element 10a is free to move axially in the supporting part 2a.

Figure 11:
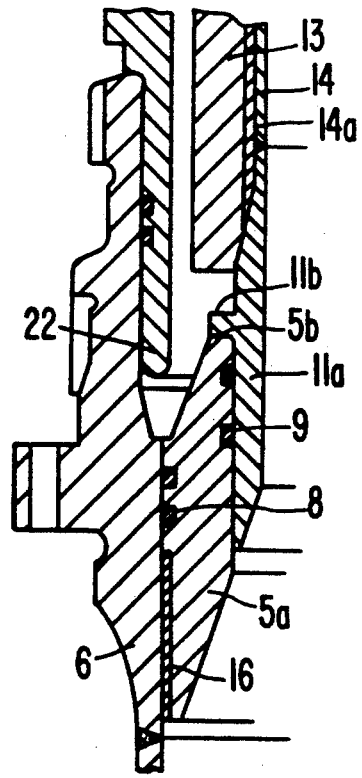
Figure 8:
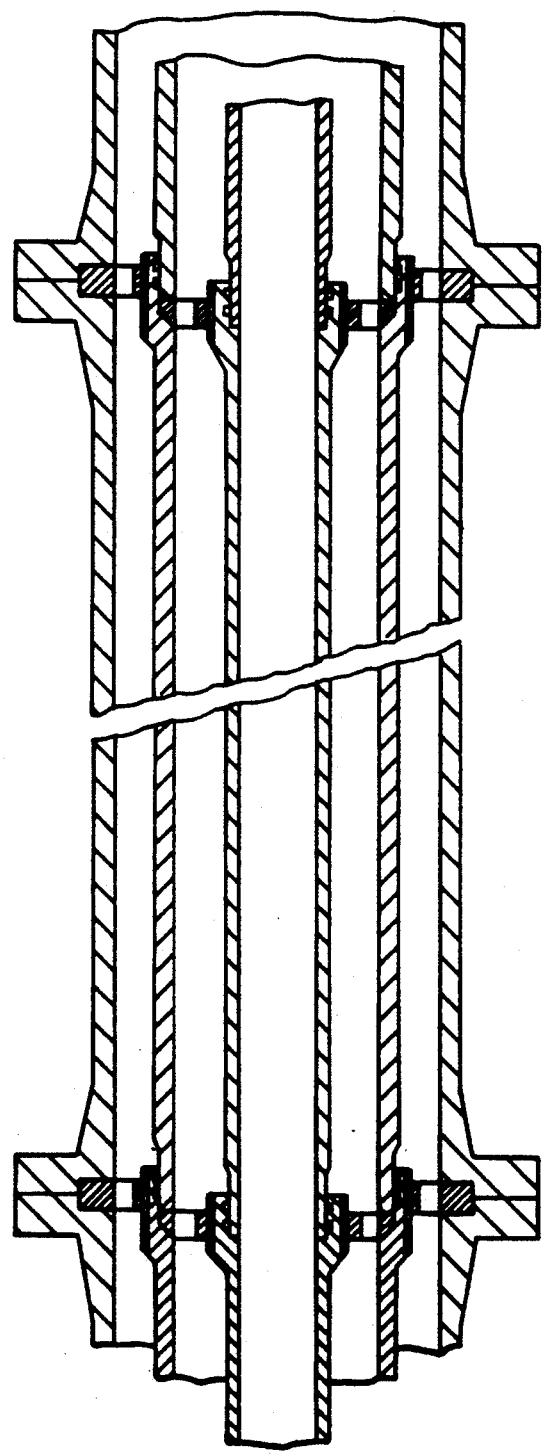
FIG. 8 is a longitudinal cross-sectional view of the sleeving including another sleeving.

FIG. 11 illustrates a supporting part 5a for supporting the lowest element 11a of the sleeving conduit, with the supporting part 5a being substantially identical to the sealing part 5 in FIG. 2. However, the supporting part 5a has a supporting surface 5b cooperable with a stop 11b integral with the lowermost element 11a. Supporting part 5a transmits the forces produced by the weight of the element 11a to the element 6 of the extension tube.

In this embodiment, the upper element of the sleeving conduit may be identical to that of FIG. 4A, but without collar 21a, so as to allow free axial displacement of this element. Moreover, in this embodiment, the normal supporting parts have two ends and the normal sleeving conduit elements have two male ends each, with tightness between the various ends being produced by seals.

We claim:

1. Assembly comprising an extension tube and a sleeving conduit inside the extension tube, said tube having several elements connected together, characterized by said sleeving conduit having several conduit elements and by said assembly having assembly means for each of said conduit elements on respective elements of said tube, whereby each conduit element is respectfully supported by the respective elements of said tube.

2. Assembly according to claim 1, wherein at least one of said conduit elements includes a means for creating a buoyancy in said conduit element.

3. Assembly according to claim 1, wherein adjacent ends of two tube elements includes a bayonet type connector.

4. Assembly according to claim 1, wherein guiding and bearing means are provided for guiding and providing a bearing support of said sleeving conduit in said extension tube.

5. Assembly according to claim 1, said extension tube includes at least one of an opening in a vicinity of a lower end and another opening in a vicinity of an upper end thereof, and wherein at least one of said openings is adapted to be connected to means for circulating a fluid in an annular space defined by an inner wall of the extension tube and an outer wall of the sleeving conduit.

6. Assembly according to claim 1, wherein each conduit element includes two ends, a male and a female and, said male end being adapted to cooperate with the female end of an adjacent conduit element, and wherein means are provided for forming a seal between a space inside the conduit element and an annular space defined between an inner wall of the extension tube and an outer wall of the sleeving conduit.

7. Assembly according to claim 6, wherein a male end of one conduit element is adapted to slide in the female end of an adjacent conduit element.

8. Assembly according to clam 1, wherein each conduit element includes two male ends, and wherein the assembly means have supporting parts with two female ends, with the female ends of said supporting parts cooperating with the male ends of said conduit elements.

9. Assembly according to claim 8, wherein an upper end of one conduit element is adapted to slide in a corresponding supporting part.

10. Assembly comprising an extension tube and a sleeving conduit inside the extension tube, said tube having several elements connected together, characterized by said sleeving conduit having several conduit elements and by said assembly having assembly means for each of said conduit elements on wherein said assembly means includes a supporting part attached to one end of the respective conduit elements, said supporting part being adapted to fit into a recess located at the end of an associated tube element, and wherein said supporting part includes passages for allowing one of said circulation and communication through an annular space defined between an inner wall of the extension tube and an outer wall of the sleeving conduit.

11. Assembly according to claim 10, wherein ends of two adjacent tube elements cooperate with each other to limit displacements of said supporting part.

12. Assembly according to claim 10, wherein said supporting part includes a suspension member.

13. Assembly according to claim 10, wherein said supporting part includes a bearing supporting a load of a sleeving conduit element located above said bearing.

14. Assembly according to one of claims 10, 11, 12 or 13, wherein sealing means are provided at and upper end and a lower end of the sleeving conduit for sealing the annular space, and wherein the sealing means at the lower allows the sleeving conduit to slide relative to the tube.

15. Assembly comprising an extension tube and a sleeving conduit inside the extension tube, said tube having several elements connected together, characterized by said sleeving conduit having several conduit elements and by said assembly having assembly means for each of said conduit elements on respective elements of said tube, wherein at least one of said conduit elements is reinforced with reinforcing strips, said reinforcing strips being located at least at a portion of said at least one conduit element.

16. Assembly comprising an extension tube and a sleeving conduit inside the extension tube, said tube having several elements connected together, characterized by said sleeving conduit having several conduit elements and by said assembly having assembly means for each of said conduit elements on respective elements of said tube, further comprising at least one other conduit including a plurality of elements connected together, said at least one other conduit being disposed inside said sleeving conduit, and wherein said assembly further includes means for respectively connecting each of the elements of said at least one other conduit to respective conduit elements of said sleeving conduit.

* * * * *